US012749413B2

(12) United States Patent
Fey et al.

(10) Patent No.: US 12,749,413 B2
(45) Date of Patent: Sep. 29, 2026

(54) SYSTEMS AND METHODS FOR TROCAR SIMULATION WITH ADMITTANCE HAPTIC FEEDBACK

(71) Applicant: BOARD OF REGENTS, THE UNIVERSITY OF TEXAS SYSTEM, Austin, TX (US)

(72) Inventors: Ann Majewicz Fey, Austin, TX (US); Kimberly Kho, Dallas, TX (US); Aldo Galvan, Austin, TX (US); Marian Y. Williams-Brown, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 325 days.

(21) Appl. No.: 18/576,938

(22) PCT Filed: Jul. 6, 2022

(86) PCT No.: PCT/US2022/073455
§ 371 (c)(1),
(2) Date: Jan. 5, 2024

(87) PCT Pub. No.: WO2023/283572
PCT Pub. Date: Jan. 12, 2023

(65) Prior Publication Data

US 2024/0257666 A1 Aug. 1, 2024

Related U.S. Application Data

(60) Provisional application No. 63/218,783, filed on Jul. 6, 2021.

(51) Int. Cl.
*G09B 23/28* (2006.01)

(52) U.S. Cl.
CPC .................................. *G09B 23/285* (2013.01)

(58) Field of Classification Search
CPC ....... G09B 23/28; G09B 23/285; G09B 23/30
See application file for complete search history.

(56) References Cited

U.S. PATENT DOCUMENTS 6,377,011 B1 4/2002 Ben-Ur
6,850,222 B1 2/2005 Rosenberg
(Continued)

FOREIGN PATENT DOCUMENTS

EP 3139362 A1 3/2017
WO WO 2022/082377 A1 4/2022

OTHER PUBLICATIONS

Da Costa et al., "Haptic Simulator for Trocar Insertion Training," UT Southwestern Medical Center Undergraduate Poster Presentation, dated May 7, 2018.
Galvan, Aldo, et al. "Haptic Simulator for Trocar Insertion Training." *2021 IEEE World Haptics Conference* (*WHC*). IEEE, Jul. 2021.
(Continued)

*Primary Examiner* — Robert J Utama
(74) *Attorney, Agent, or Firm* — pH IP Law

(57) ABSTRACT

Devices, systems and methods to provide an admittance haptic feedback in response to an external force input applied to an elongated member in order to simulate a trocar insertion. In certain embodiments, the admittance haptic feedback is configured to simulate penetration of and advancement through a plurality of layers of tissue of a patient, and in particular embodiments, the admittance haptic feedback is configured to simulate penetration of and advancement through a skin layer, a muscle and fat layer, and a peritoneum layer.

18 Claims, 9 Drawing Sheets

(56) References Cited

U.S. PATENT DOCUMENTS

| | | | | |
|---|---|---|---|---|
| 2004/0024418 | A1* | 2/2004 | Irion | G09B 19/24 606/205 |
| 2005/0162383 | A1* | 7/2005 | Rosenberg | G06F 3/03545 345/156 |
| 2010/0041004 | A1 | 2/2010 | Meglan | |
| 2012/0301858 | A1* | 11/2012 | Park | G09B 23/285 434/262 |
| 2015/0187229 | A1 | 7/2015 | Wachli et al. | |
| 2015/0206456 | A1* | 7/2015 | Foster | G09B 23/30 434/262 |
| 2015/0325147 | A1* | 11/2015 | Johansson | G09B 23/28 434/262 |
| 2017/0249865 | A1 | 8/2017 | Lavigueur et al. | |
| 2022/0160449 | A1 | 5/2022 | Bowling | |

OTHER PUBLICATIONS

International Preliminary Report on Patentability issued in International Application No. PCT/US2022/073455, dated Jan. 18, 2024.

International Search Report and Written Opinion issued in International Application No. PCT/US2022/073455, dated Sep. 27, 2022.

Peters, Jessica. “Implementation of Compliant Motion Control Schemes on the Stewart Platform.” Thesis, Technical University of Munich, Mar. 2019.

Sun, Junpeng, and Kotaro Tadano. “A Novel Device for Safe Trocar Insertion in Laparoscopic Surgery Based on the Insertion Force Characteristics.” *International Journal of Bioscience, Biochemistry and Bioinformatics* 9.1 (2019): 1-8.

* cited by examiner

Fig. 3: Simplified structure of abdominal wall

Fig. 5: M = 1kg, K=1 N/mm, B=1 Ns/mm

Fig. 6: M = 0.1kg, K=0.1 N/mm, B=0.1 Ns/mm

Fig. 7: M = 5kg, K=5 N/mm, B=2.5 Ns/mm

Fig. 8: Simulation Force-Displacement distributions

Fig. 9: Simulation Force-Time distributions

Fig. 10: Puncture out displacement and velocity values for 20 trials

SYSTEMS AND METHODS FOR TROCAR SIMULATION WITH ADMITTANCE HAPTIC FEEDBACK

CROSS-REFERENCE TO RELATED APPLICATIONS

This application is a national phase application under 35 U.S.C. § 371 of International Application No. PCT/US2022/073455, filed Jul. 6, 2022, which claims priority to U.S. Patent Application No. 63/218,783, filed Jul. 6, 2021, each of which are incorporated herein by reference in their entirety.

BACKGROUND INFORMATION

Minimally invasive surgery has become widespread due to its smaller incisions and faster recovery times as compared to traditional surgery. However, laparoscopic surgery is not without challenges and certain serious safety risks for the patient. Trocar insertion is a necessary preparatory procedure for laparoscopic surgery during which a port is created through which laparoscopic instruments can be placed in the abdomen. This task is associated with a relatively high injury rate, typically attributed to surgical error. Previous studies have found that with sufficient training, these errors can be reduced or prevented, however, limited technologies exist to practice this procedure outside the operating room.

A trocar is a medical device consisting of an tapered tip, hollow cylinder, and a seal which is inserted into the abdomen prior to laparoscopic surgery. These devices function as ports of entry for the insertion of other medical tools. The initial trocar insertion involves the insufflation of the abdomen with carbon dioxide and creation of the pneumoperitoneum, which allows for higher accessibility and visibility to the surgeon [1]. The insertion of trocars is one of the riskiest part of laparoscopic surgery and there is a relatively high potential for injuries to the bowel and vascular system. Of these, 30-50% of bowel injuries and 15-50% go undiagnosed during surgery leading to higher mortality rates associated with trocar insertion [2]. Studies show that patient injuries occur most frequently during initial trocar insertion prior to insufflation of the abdomen. Between 1997 and mid-2002, the FDA received about 1353 laparoscopic trocar-associated injury reports, including reports of 36 fatalities [3]. There are a number of factors which contribute to the inherent difficulty of trocar insertion. In particular, since the initial trocar is inserted without visual feedback, the surgeon must rely on force, or kinesthetic feedback, to gauge the relative location of the trocar tip within the anterior abdominal wall. This is compounded by other variables including patient BMI, trocar types, and entry technique lending the procedure inherent unpredictability [4], [5].

The issues associated with complex medical procedures, such as laparoscopic entry, can be addressed by adequately training students routinely and consistently until they are sufficiently adept at the task to be able to perform it in vivo [6]. Of these training methods, medical simulators provide the opportunity to train students in a standardized method while cutting out risks to patients [7]. These simulators are typically implemented as generalized feedback devices with a variety of simulations coded within, however the development of simulators with the express purpose of training on a specific procedure, such as bone-sawing, have also been found in the literature [8]. For trocar insertion, commonly used training methods include passive devices which seek to emulate the abdominal wall using synthetic materials but these do little more than provide constant resistance to the user and do not capture the spatial and temporal variance of a true trocar insertion. The need for an adequate training device is known and there have been attempts to develop haptic simulators to address the issue [9]. Although these training simulators address the issue of modeling the trocar insertion procedure they necessitate costly and bulky mechanisms which place them outside the realm of practicality for many institutions. In addition, these devices typically use impedance haptics.

SUMMARY

Exemplary embodiments of the present disclosure include systems and methods for an admittance haptic display that is designed to simulate the trocar insertion procedure. Embodiments of the present disclosure are shown to be able to render the necessary range of forces necessary to simulation trocar insertion. In addition, a simplified numerical model is developed which captures key characteristics of a typical trocar insertion force profile through multiple layers of the anterior abdominal wall. Embodiments of the present disclosure can provide promising results as a haptic display and medical training device.

As discussed further below, exemplary embodiments of the present disclosure provide force feedback that is not provided by typical systems that utilize servo motors. Typical servo motor systems do not allow the traditional impedance control that is used in most haptic devices where a force sensation is created for the human user that is a function of how the user moves the device. For example, the servo motors typically do not allow the user to move the device. Embodiments of the present disclosure comprise a force sensor to enable haptic feedback with admittance control.

In admittance control, the system creates a force feedback sensation by moving the device in position based on the user-applied force, as opposed to creating force based on an applied position change.

Exemplary embodiments of the present disclosure also utilize a multi-layer model based on published data from human subjects to simulate the penetration of and advancement through a plurality of tissue layers of the subject. In particular, exemplary embodiments utilize an energy-based algorithm to represent the layers. In typical systems, admittance devices take an applied force and map directly to position of the haptic device, usually as a spring force (e.g. $X_{desired}=F_{applied/k}$ where k is a virtual spring) or a similar method for damping force. Exemplary embodiments of the present disclosure instead treat the area under the desired force curve to represent the allowed force that could be applied to each tissue layer before it breaks.

Exemplary embodiments of the present disclosure are robust to the high forces applied by an inexperienced user. Exemplary embodiments include a novel haptic feedback device based on a Stewart platform and the implementation of a simplified simulation using the key characteristics of a typical trocar insertion force profile. Exemplary embodiments are able to successfully render the force characteristics of a trocar insertion. Exemplary embodiments also provide a low-cost and portable platform, differentiating it from other proposed trocar insertion training simulators.

The viability of the assembly as a haptic display is shown through a number of standard haptic benchmarks. Exemplary embodiments of the present disclosure can be used for training medical students or other medical personnel, leading to new laparoscopic surgeons being more familiarized with the medical procedure and a subsequent decrease in error-related injuries and deaths.

One specific embodiment of the present disclosure is based on a Stewart platform, a type of parallel manipulator which is able to rotate and translate along six degrees of freedom. These types of devices have seen application in a multitude of areas, including flight simulation [11]. In addition, similar parallel manipulators have been used as haptic displays [12].

Exemplary embodiments of the present disclosure include a system for simulating insertion of a trocar, where the system comprises: a planar member; an elongated member coupled to the planar member; a force transducer coupled to the elongated member and the planar member; a plurality of support members coupled to the planar member; and a plurality of actuators where each actuator is coupled to a support member. In particular embodiments the system comprises a computer processor, where: the system is configured to provide an admittance haptic feedback in response to an external force input applied to the elongated member; and the admittance haptic feedback is configured to simulate penetration of and advancement through a plurality of tissue layers.

Certain embodiments further comprise a visual display of the elongated member and the plurality of tissue layers. In specific embodiments the admittance haptic feedback is configured to simulate penetration of and advancement through a skin layer, a muscle and fat layer, and a peritoneum layer. In some embodiments the admittance haptic feedback provides: a force feedback when the elongated member is moved with respect to the planar member; a first decrease in force feedback to simulate penetration of the skin layer; a second decrease in force feedback to simulate penetration of the muscle and fat layer; and a third decrease in force feedback to simulate penetration of the peritoneum layer.

In specific embodiments the visual display communicates with the computer processor such that a simulated movement of the elongated member in the visual display is synchronized with a movement of the elongated member. In certain embodiments the simulated movement of the elongated member in the visual display is synchronized with the force feedback when the elongated member is moved with respect to the planar member. In particular embodiments the simulated movement of the elongated member in the visual display simulates a visual display of penetration of the skin layer by the elongated member when the admittance haptic feedback provides the first decrease in force feedback to simulate penetration of the skin layer.

In specific embodiments the simulated movement of the elongated member in the visual display simulates a visual display of penetration of the muscle and fat layer by the elongated member when the admittance haptic feedback provides the second decrease in force feedback to simulate penetration of the muscle and fat layer. In some embodiments the simulated movement of the elongated member in the visual display simulates a visual display of penetration of the peritoneum layer by the elongated member when the admittance haptic feedback provides the third decrease in force feedback to simulate penetration of the peritoneum layer.

In certain embodiments the system provides the admittance haptic feedback by sensing the external force input and outputting a corresponding displacement of the elongated member. In particular embodiments the wherein the plurality of actuators are configured as servomotors. In specific embodiments the system further comprises a second planar member comprising an aperture; and the elongated member extends through the aperture. Some embodiments further comprise a third planar member, where the plurality of actuators are coupled to the third planar member.

Exemplary embodiments include a method of simulating insertion of a trocar, where the method comprises: providing an admittance haptic feedback in response to an external force input applied to an elongated member, where the admittance haptic feedback is configured to simulate penetration of and advancement through a plurality of layers of tissue of a patient. In certain embodiments the admittance haptic feedback is configured to simulate penetration of and advancement through a skin layer, a muscle and fat layer, and a peritoneum layer. In particular embodiments providing the admittance haptic feedback comprises sensing the external force input and outputting a corresponding displacement of the elongated member. In specific embodiments the corresponding displacement of the elongated member is generated by a plurality of actuators.

In certain embodiments the admittance haptic feedback provides: a force feedback when the elongated member is moved; a first decrease in force feedback to simulate penetration of the skin layer; a second decrease in force feedback to simulate penetration of the muscle and fat layer; and a third decrease in force feedback to simulate penetration of the peritoneum layer. Particular embodiments comprise displaying a simulated movement of the elongated member that is synchronized with a movement of the elongated member. In some embodiments the simulated movement of the elongated member is synchronized with the force feedback when the elongated member is moved.

In specific embodiments the simulated movement of the elongated member simulates a visual display of penetration of the skin layer by the elongated member when the admittance haptic feedback provides the first decrease in force feedback to simulate penetration of the skin layer. In certain embodiments the simulated movement of the elongated member simulates a visual display of penetration of the muscle and fat layer by the elongated member when the admittance haptic feedback provides the second decrease in force feedback to simulate penetration of the muscle and fat layer. In particular embodiments the simulated movement of the elongated member simulates a visual display of penetration of the peritoneum layer by the elongated member when the admittance haptic feedback provides the third decrease in force feedback to simulate penetration of the peritoneum layer.

In the present disclosure, the term "coupled" is defined as connected, although not necessarily directly, and not necessarily mechanically.

The use of the word "a" or "an" when used in conjunction with the term "comprising" in the claims and/or the specification may mean "one," but it is also consistent with the meaning of "one or more" or "at least one." The terms "approximately, "about" or "substantially" mean, in general, the stated value plus or minus 10%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will be apparent to those skilled in the art from this detailed description.

BRIEF DESCRIPTION OF THE FIGURES

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF EXEMPLARY EMBODIMENTS

Figure 1:
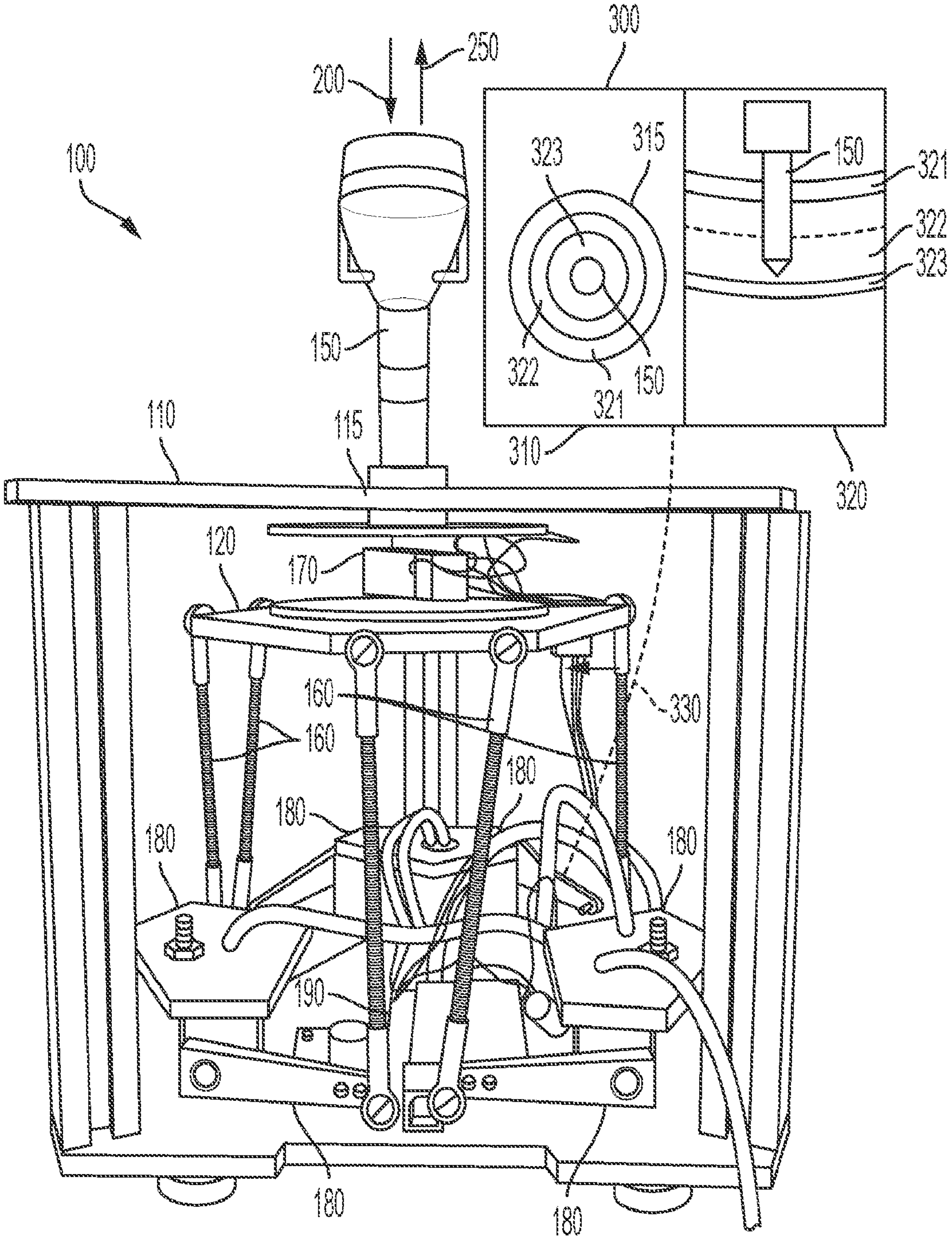
FIG. 1 illustrates a front perspective view of an exemplary embodiment of a system according to the present disclosure.
Figure 2:
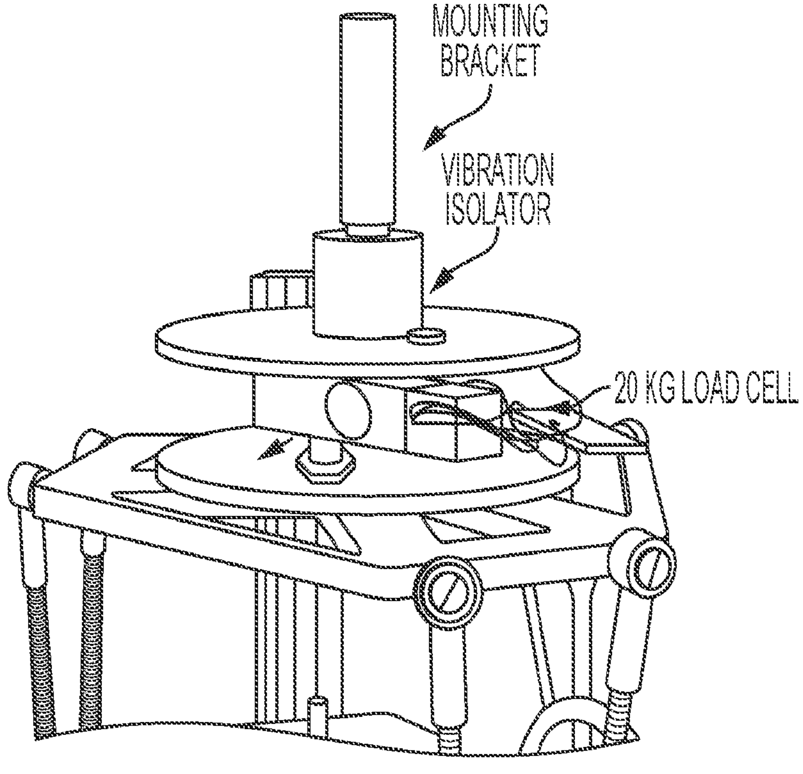
FIG. 2 illustrates a front perspective view of a portion of the embodiment of FIG. 1.

Referring initially to FIGS. 1-2, an embodiment of a system 100 for simulating insertion of a trocar is shown. In this embodiment, system 100 comprises a first planar member 110 comprising an aperture 115, as well as an elongated member 150 extending through aperture 115 of planar member 110. In addition, system 100 comprises a second planar member 120 coupled to the elongated member 150. System 100 further comprises a plurality of support members 160 and a plurality of actuators 180, where each actuator 180 is coupled to a support member 160. In the illustrated embodiment, a first end of each support member 160 is coupled to second planar member 120, while a second end of each support member 160 is coupled to an actuator 180.

In this embodiment, system 100 also comprises a force transducer 170 coupled to the elongated member 150 and second planar member 120. System 100 further comprises a computer processor 190, where system 100 is configured to provide an admittance haptic feedback force 250 in response to an external force 200 input applied to elongated member 150 such that elongated member 150 moves with respect to first planar member 150. In addition, certain embodiments of system 100 comprise a third planar member 130, where the plurality of actuators 180 are coupled to third planar member 130.

Figure 3:
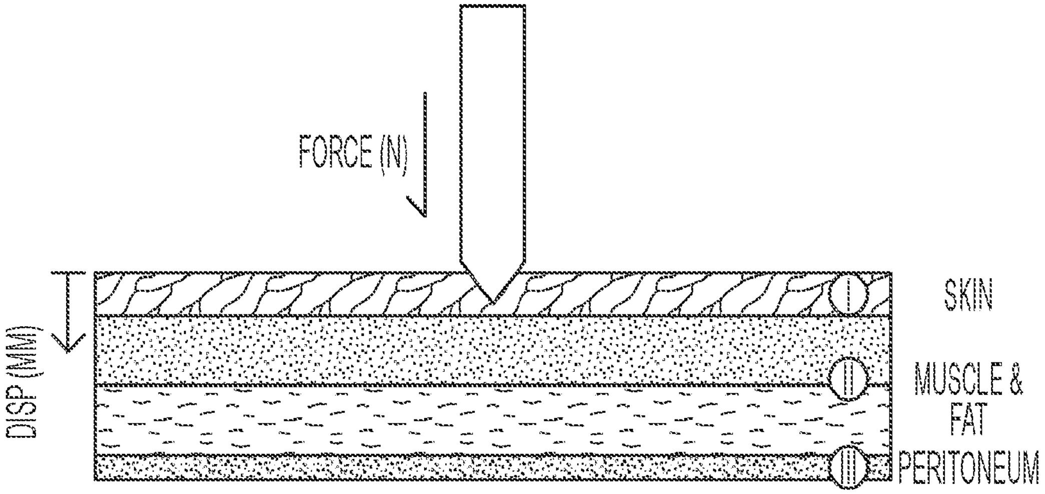
FIG. 3 illustrates a schematic view of a plurality of tissue layers simulated by the embodiment of FIG. 1.
Figure 4:
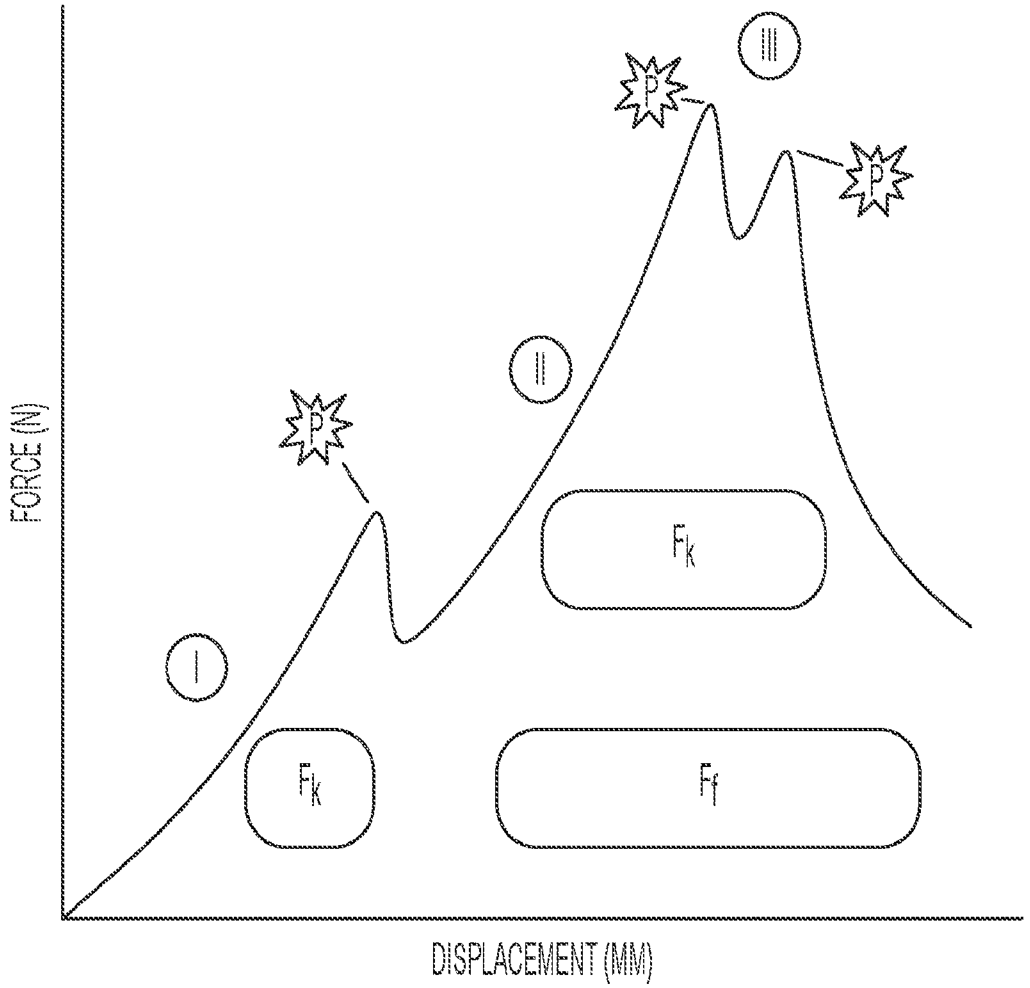
FIG. 4 illustrates a graph of a characteristic insertion curve of insertion and geometric interpretation of force contributions for the tissue layers illustrated in FIG. 3.

As discussed further below, system 100 provides an admittance haptic feedback to a user in a manner that simulates layers of tissues as force 200 is applied to elongated member 150 (e.g. a trocar or trocar simulator). In specific embodiments, system 100 simulates feedback of penetrating and advancing through a skin layer, a muscle and fat layer, and a peritoneum layer as shown in FIGS. 3 and 4.

In certain embodiments, system 100 comprises a display 300 configured to visually simulate a display of movement of elongated member 150 through a skin layer, a muscle and fat layer, and a peritoneum layer. In particular embodiments, display 300 may comprise a first display 310 configured to simulate an endoscopic view 315, and a second display 320 configured to display a side view. Other embodiments may comprise a single view display, or a different combination of displays. In certain embodiments, display 300 may be a computer monitor display or a virtual reality type of display worn as headgear by the user.

In the embodiment shown, second display 320 is configured to simulate a side section view of elongated member 150 penetrating a skin layer 321, a muscle and fat layer 322 and a peritoneum layer 323. In specific embodiments, display 300 communicates with computer processor 190 via signal 330, so that the simulated display shown in display 300 is synchronized with the movement of elongated member 150 and the admittance haptic feedback force 250.

It is understood displays 310 and 320 shown in FIG. 1 are schematic graphical representations, and that actual displays may comprise additional visual detail or different configurations. For example, while all three layers 321, 322 and 323 are shown simultaneously in endoscopic view 315, it is understood that only a single layer may be endoscopically visible during operation of system 100. As discussed further below, display 300 can be synchronized such that the decreases in force associated with the penetration of each layer shown in FIG. 4 is timed with the advancement through the corresponding layer shown in display 300.

In particular, the same position variables used in Equations 3(a) and 3(b) discussed below in the section entitled "Haptic Control Law" can be used to create the rendered visualization that corresponds with the tissue layer rupture events shown in FIG. 4. For example, prior to the haptic feedback simulating a rupture event indicating puncture of the skin layer 321, displays 310 and 320 can render visualization of the distal end of elongated member positioned within skin layer 321. After the first puncture event is simulated by the haptic feedback (but prior to a second puncture event being simulated), displays 310 and 320 can render visualization of the distal end of elongated member positioned within muscle and fat layer 322. Similarly, between the second and third puncture events simulated by the haptic feedback control, displays 310 and 320 can render visualization of the distal end of elongated member positioned within peritoneum layer 323. Finally, after the third puncture event simulated by the haptic the haptic feedback control, displays 310 and 320 can render visualization of the distal end of elongated member positioned beyond peritoneum layer 323 (e.g. into the abdominal cavity). It is understood that the specific embodiment discussed herein is merely exemplary, and other embodiments may comprise different aspects of synchronization between the haptic feedback control and the visual display or displays.

Mechanical Assembly

It is understood that the specific embodiment discussed below is merely one particular implementation of a system according to the present disclosure. Other embodiments within the scope of this disclosure may comprise different components or specifications. In a specific embodiment, the haptic display implements six high-torque Batan S1213 servo motors as the actuation source. At a stalling torque of 4.5 kg/cm for each motor, the system is able to withstand forces well beyond those of a typical trocar insertion. In this embodiment, the servos are fixed to the base of the device and connect to the upper platform across an aluminum segment. Also in this embodiment, mounted on the upper platform is a secondary platform housing a 1DOF 10 kg load cell which is interfaced with a RobotShop Wheatstone Amplifier Shield. The haptic display is of admittance type, meaning it senses an external force input and outputs a corresponding displacement. These types of devices are typically unstable at low inertias [13]. To solve this, there is a layer of damping pads between the force sensing platform and the kinematic assembly. In particular embodiments, the pads are visco-elastic and have a high damping coefficient. In one specific embodiment, the pads are Sorbothane® pads. This provides some physical damping helpful for maintaining device passivity and stability. A 12 mm diameter trocar is mounted on a vibration isolator using a spacer with outer diameter equal to the inner diameter of the trocar.

Controller

In one exemplary embodiment, the system is controlled with an Arduino Mega 2560 micro-processor. The low processing power of the microprocessor is known and addressed with a simplified force model of the trocar insertion. As mentioned, a Stewart platform allows motion with six degrees of freedom, however the current simulation is limited to a one dimensional displacement in the direction of the input force vector. The height of the platform is defined as the distance between the upper platform and the rotational axes of the servos. The height is then governed by the angular position of the servos through forward kinematics. A feedback position measurement is taken from the servo motor rotary encoders and is used for position control. For the haptic simulation the input is the human force input, $F_{app}$, and the output is the commanded platform position, x (mm).

Description of Simulation

For a typical simulation the user will hold the input trocar in whichever manner is comfortable and begin the insertion by applying a downward force. Since a typical entry technique includes a torquing motion by the surgeon the device is designed to allow for a free rotational displacement of the trocar subject only to frictional forces [14]. The simulation commences with the virtual tool in light contact with the surface of the virtual abdomen and ends with the puncture into the abdomen. Although a negative displacement is allowed upon a negative force differential, the users are encouraged to complete the simulation with a continuously increasing force input as would be expected during a true insertion. For every trial run of the device a number of data parameters are recorded (e.g. in an external SD card) for a subsequent analysis of insertion technique.

Trocar Insertion Characteristics

To create an effective simulation an empirical model is developed which governs the dynamics between the virtual tool and the virtual environment. This virtual environment is represented as the inner continuum of the abdomen wherein the difficulty lies in the highly complex mechanics of soft tissue which makes it difficult and computationally costly to render a high accuracy model. Most attempts to model the trocar insertion procedure rely on methods such as finite element or machine learning techniques to find expected force response as a function of some set of input variables [10], [15]. Due to computational limitations, the inventors opt for simpler methods of modeling by investigating the force profile, the curve defining force with respect to displacement, of a typical trocar insertion.

Insertion Description

Previous experiments into the force characteristics of trocar insertion have recorded the force input of an expert surgeon during an ex- or in-vivo insertion, while others have used mechanical set ups to insert a trocar into a porcine model with a constant velocity input [17] [18] [19].

The insertion of a needle across the abdomen will exhibit the characteristic force profile shown in FIG. 4 which exhibits a non-linear distribution. The shape of the curve is a direct consequence of the anatomical structure of the human abdomen which can be simplified to a set of discrete tissue layers as shown in FIG. 3. These layers can be identified within the experimental force profile as the continuous intervals between significant dips in applied force. The interactions are separated into phases corresponding to the tissue layer with which the trocar tip is in contact. A brief description of the insertion follows.

1) Phase I—Skin: The initial phase represents the interval between the first contact of the tool tip with the skin up until the breaking point of the skin membrane. The abdomen will tend to deform elastically and finds that it will reach its maximum deformation at the end of this phase. This phase ends once the necessary puncture force is reached for the tip to penetrate through the skin. Since the tool remains external to the tissue a relatively lower value for damping is assumed in this phase.

2) Puncture Event: There are intermediary points between every phase denoted as puncture events which separate what would otherwise be a continuous force profile. Here, the inserting tip ruptures through the surface of the soft tissue and is followed by an immediate drop in applied force as stiffness drops considerably [20]. The puncture event is not a phase of the insertion but rather a consequence of failure of an elastic tissue membrane where, due to its multilayered structure, the abdominal wall will exhibit three such puncture events.

Referring now to FIGS. 1 and 4, as the force associated with the first puncture event is decreased, display 320 simulates elongated member 150 as fully penetrating skin layer 321 and entering muscle and fat layer 322. Similarly, endoscopic view 315 shown in display 310 simulates a visual display of penetration of skin layer 321 by elongated member 150. As the user moves elongated member 150 further (simulating further insertion of a trocar), the second puncture event is simulated, resulting in a decrease in force feedback to the user and displays 310 and 320 simulating elongated member 150 fully penetrating muscle and fat layer 322 and entering peritoneum layer 323. Finally, as the user moves elongated member 150 further, the third puncture event is simulated, resulting in a decrease in force feedback to the user and displays 310 and 320 simulating elongated member 150 fully penetrating peritoneum layer 323.

By providing both visual and haptic feedback to the user, system 100 is configured to accurately and realistically simulate insertion of a trocar or other medical instrument. Accordingly, the training time for trocar insertion by medical personnel can be reduced. In addition, more consistent techniques can be developed by medical personnel during training, resulting in fewer errors or complications during trocar insertion.

3) Phase II—Muscle and Fat: After the puncture through the skin the device will be in contact with the inner continuum of the abdominal wall. Although the structure consists of a variety of soft tissues, including muscle and adipose, the continuity of the force profile allows us to treat it as homogeneous. Once the tool tip has fully crossed the width of the abdomen it will reach a second puncture event where it breaks through the lower portion and contacts the innermost portion of the abdominal wall. As the trocar traverses the inner soft tissue it will be subject to high frictional forces and thus damping values are assumed to increase considerably.

4) Phase III—Peritoneum: The last phase represents the final point of contact of the tool tip with an elastic tissue membrane. This innermost layer is the peritoneal lining which supports most of the inner organs and, although it is attached to the upper portions of the abdomen, it will tend to separate and deform independently upon contact with the trocar [19]. Consequentially, the contact point with the peritoneum will see a slight increase in stiffness due to the elasticity of this thin layer of tissue. It is the briefest of all the sections however it is the most critical to model as overexertion of force at this point leads to a higher penetration distance into the abdominal cavity and consequently a higher risk of injury. This final puncture of the peritoneum will see tissue elasticity disappear and any resistance experienced will be limited to frictional forces as the surface area of the trocar slides without restriction through the inner portion of the abdomen.

Numerical Model

Exemplary embodiments can use our interpretation of the insertion process from the previous section to develop a numerical model which will be used in the simulation. Modeling simplicity is prioritized by fitting a piece-wise polynomial to an experimental force profile, namely that of [18], defining the total force applied on the trocar, FT, as a function of absolute displacement, x, resulting in a function of the general form shown in Eq. 1.

$$F_T(x) = \begin{cases} a_1x + b_1x^2 & \text{Section } I \\ a_2x + b_2x^2 + c_2 & \text{Section } II \\ a_3x + b_3x^2 + c_3 & \text{Section } III \end{cases} \tag{1}$$

where $a_{1:2:3}$, $b_{1:2:3}$, and $c_{2:3}$ are arbitrary constants, and x are displacements from the upper skin layer. This defines the force applied on the trocar as a function of displacement from the initial point of contact for each corresponding phase.

An additional consideration is made on the ranges of x for each phase. The puncture point between phases cannot be assumed constant since mode or technique of entry will typically have a considerable effect on the final force profile. Exemplary embodiments therefore consider the area under the force profile curve as the total elastic potential energy of the soft tissue and, integrating over known bounds, one can find a constant value which represents the total work that can be applied to the tissue of interest prior to failure. The inventors then set this constant value as the criterion for breaking by continually summing the work applied, $$W_{app} = \overrightarrow{F_{app}} \cdot \vec{x},$$

and seeing if this external work exceeds the amount of elastic potential energy of the tissue, at which point the breakage will occur.

The result is not a fully realized model but a simplified one that still captures key trocar insertion characteristics, namely position dependencies and intermediary discontinuities, using a simplified polynomial model which can be easily implemented on a processor with low computational power. The primary simulation was modeled based on the insertion of a 12 mm bladed trocar into the abdomen, however using experimental data any other type of trocar or veress needle can be modeled in the same way since they will exhibit the same type of force distribution.

Haptic Display

Most haptic simulations commence with a collision detection algorithm to determine whether the virtual tool is in contact with a virtual surface. However, the simulation begins and ends under the assumption of continuous contact with a deformable material, therefore it is only necessary to implement the force rendering portion of a complete haptic rendering algorithm, while only accounting for the relative position of the trocar within the abdomen. Additionally, the inventors make the trivial assumption that the configuration of the haptic device and virtual tool are equivalent, a method known as direct rendering, making virtual coupling unnecessary.

There are many different methods that are used to render virtual objects and among these, the simplest is the virtual wall which will treat force response beyond an equilibrium point as sourced by a parallel spring, K (N/mm), and damper, B (Ns/mm) which will capture the positional and velocity dependent forces respectively. For simplicity, the inventors ignore the inertial parameter, M (kg), however a discussion of the mass rendering capabilities of our haptic device is presented in the results for validation.

Haptic Parameters

The use of damping and stiffness characteristics requires calculation of a set of haptic parameters, B and K, which will accurately represent the total trocar insertion. The inventors consider the stiffness characteristics to be the most important for kinesthetic feedback. Since the stiffness is known to be variable across the insertion the inventors can differentiate 1 with respect to x resulting in a function K(x) representing the stiffness as a function of displacement. The damping parameter is selected to maintain passivity and stability of the haptic display, as well as to maintain accuracy of the model, in particular maintaining a relatively lower damping value in Phase I as compared to Phases II and III. The final model is a first order differential equation in the following form.

$$F_{Trocar}(x, \dot{x}) = \begin{cases} K_1(x)x + B_1\dot{x} & \text{Section } I \\ K_2(x)x + B_2\dot{x} & \text{Section } II \\ K_3(x)x + B_3\dot{x} & \text{Section } III \end{cases} \tag{2}$$

A final consideration which is not explicitly included in the 2 are the dynamics after the final puncture event, and for this the inventors assume that stiffness disappears and the system is solely represented by a damping parameter.

Haptic Control Law

An admittance haptic device requires a displacement output due to an external force input. The inventors can numerically integrate 2 using the Forward Euler method to find the velocity output, (x)(mm/s), corresponding to the force input, $F_{app}$(N). The control law applied is shown in Eq. 3.

$$\dot{x}_n = \frac{F_{app}}{B} - \frac{K}{B}x_n \tag{3a}$$

$$x_{n+1} = x_n + T\dot{x}_n \tag{3b}$$

Where T is the haptic time step. A simplified algorithm for the full rendering process at every haptic loop, n, is shown below.

| Algorithm 1 Calculate $x_n + 1$ |
|---|
| Require: Inputs $F_{app}$, $x_n$<br>B, K ← $x_n$<br>$\dot{x}$ ← B, K, $F_{app}$<br>$x_n + 1$ ← $\dot{x}$, $x_n$, T<br>$W_{app}$ ← $F_{app}$, $x_n + 1$<br>if W > $E_{Break}$ then<br>Next Phase<br>return $X_{out}$ |

As previously noted, exemplary embodiments utilize an energy-based algorithm to represent the layers. In typical systems, admittance devices take an applied force and map directly to position of the haptic device, usually as a spring force (e.g. $X_{desired}=F_{applied/k}$ where k is a virtual spring) or a similar method for damping force. Exemplary embodiments of the present disclosure instead treat the area under the desired force curve to represent the allowed force that could be applied to each tissue layer before it breaks, as shown in equations 3a, 3b.

EXAMPLES

The inventors aim to demonstrate the validity of the constructed haptic feedback device as a training tool for trocar insertion. For the development of this device a number of novel proposals were made, namely the re-purposing of the Stewart platform as a haptic device and the development of a simplified numerical model for the rendering of a multilayered tissue.

Haptic Feedback Device

The use of a Stewart Platform as a haptic feedback device has not been found so the inventors first demonstrate the ability of the device to render a range of impedances, in specific those required for the rendering of the trocar insertion model. To test this experimentally a Spring-Damper system of variable values is rendered, K(N=mm) and B(Ns=mm) as done in the previous simulation. A mass of value, M (kg), is then coupled to the system to provide passive inertia in the virtual environment. A calibration weight of mass equal to M is then placed on the platform and left to reach steady state. The position of the platform through time is tracked using the servo encoders and compared to an ideal case of the system simulated on Matlab software.

Haptic Rendering of Trocar Insertion

Once the validity of the Stewart platform as an admittance haptic device has been demonstrated the inventors look towards validating the numerical model of a trocar insertion. The development of a simple polynomial model from what is considered a highly complex dynamical system involved the use of key assumptions and simplifications derived from the force profile of an experimental insertion. The method used to model the insertion is a novel method for the rendering of the insertion of a tool into a multilayered deformable material. Although the initial polynomial is a trivial curve fitting problem, its reformulation into a haptic model requires validation. The inventors conduct trial simulations with a user under a variety of insertion modes and techniques and examine the resulting experimental force profile. These trials are performed by an amateur user of the haptic device who is tasked with applying an increasing downward force to the haptic device and to attempt to avoid a negative displacement of the platform.

Trocar Insertion Training

The final goal of this paper was to present a novel device for trocar insertion training which the inventors seek to demonstrate by examining certain metrics of the simulation. Because most insertion injuries occur when the trocar penetrates excessively into the abdominal cavity, puncturing internal organs, the inventors localize the analysis to the state at the final point of the simulation where the virtual tool punctures through the peritoneum. In specific, two experimental values are recorded which is assumed to numerically measure a user's performance during a simulation. These are the velocity at the final puncture out of the final layer, $\dot{x}_p$, and the displacement of the tool after this point, $\Delta x_p$. Due to the COVID-19 pandemic, conducting a formal study was infeasible and therefore the data analysis is limited to the aforementioned sample trials.

Results and Discussion

Figure 5:
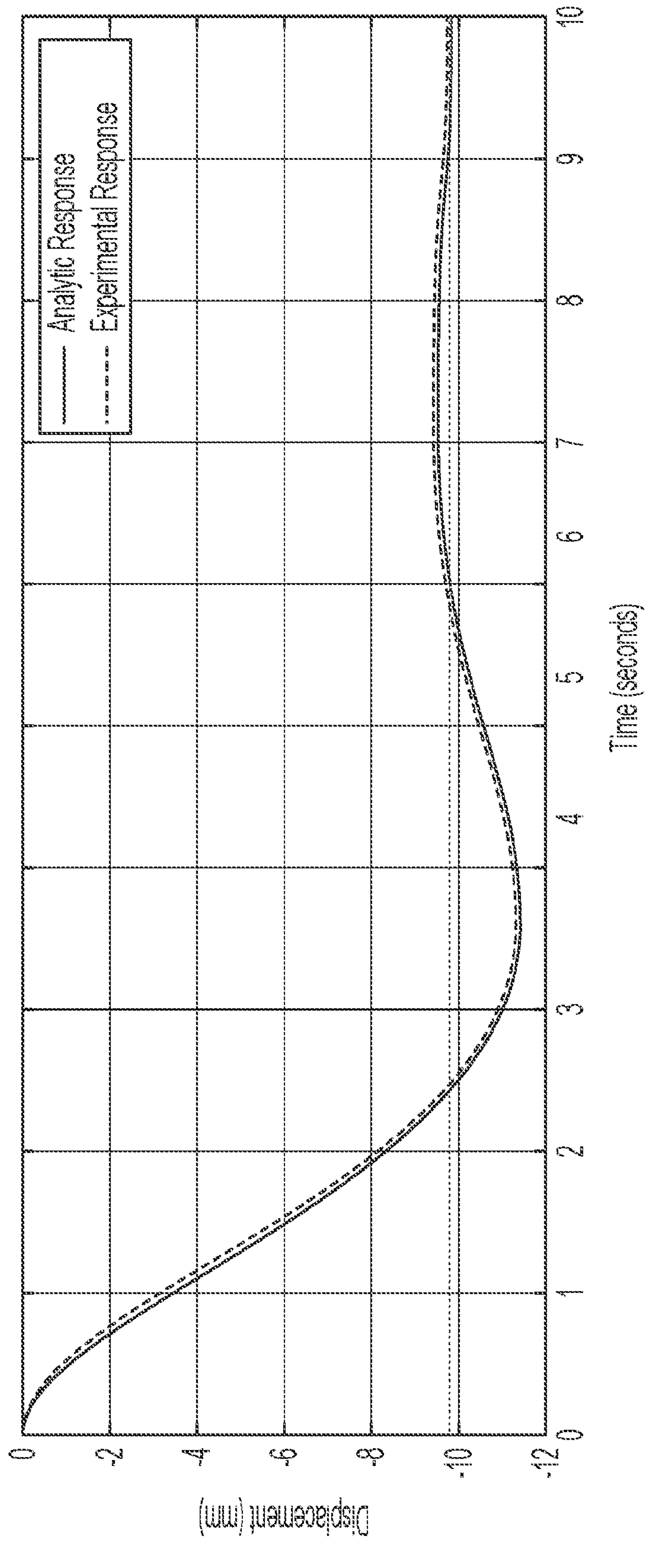
FIG. 5 illustrates a graph of an analytical and experimental response of the embodiment of FIG. 1.
Figure 6:
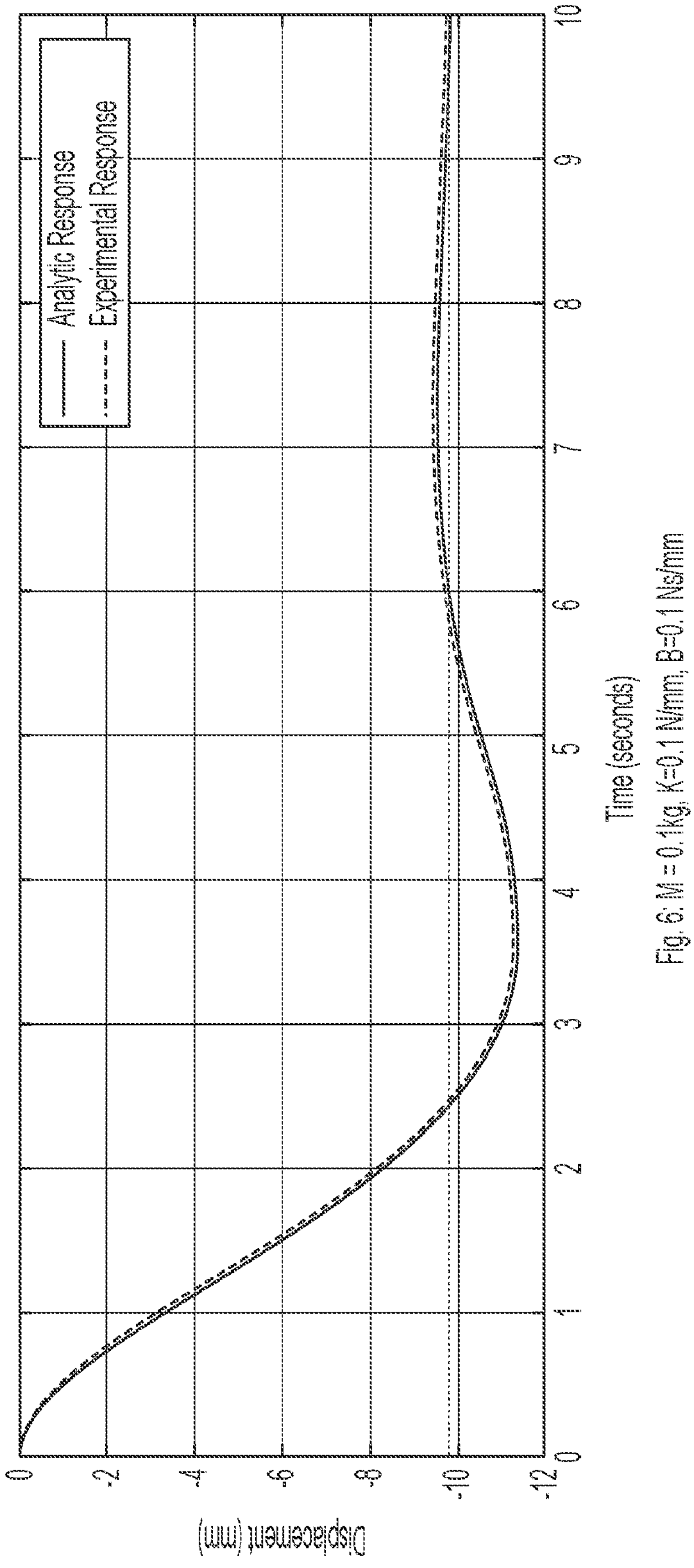
FIG. 6 illustrates a graph of an analytical and experimental response of the embodiment of FIG. 1
Figure 7:
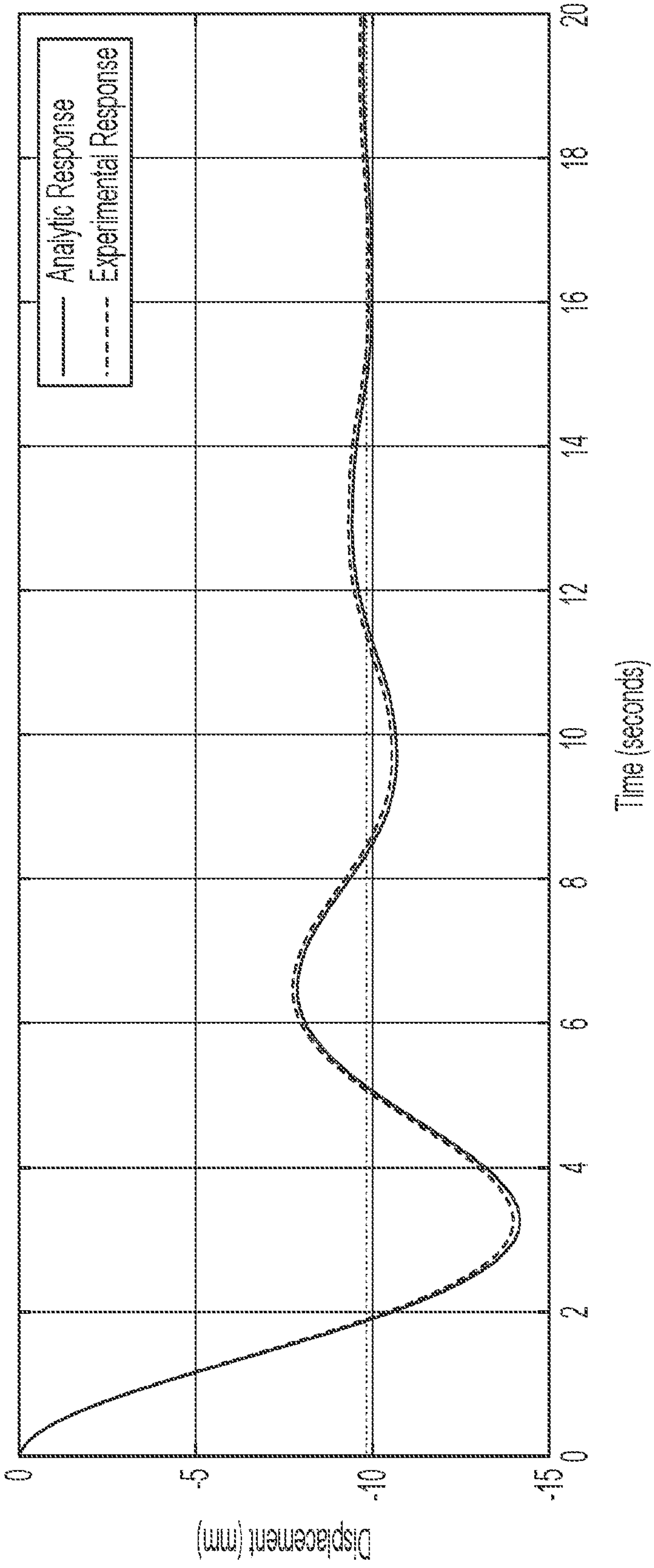
FIG. 7 illustrates a graph of an analytical and experimental response of the embodiment of FIG. 1.
Figure 8:
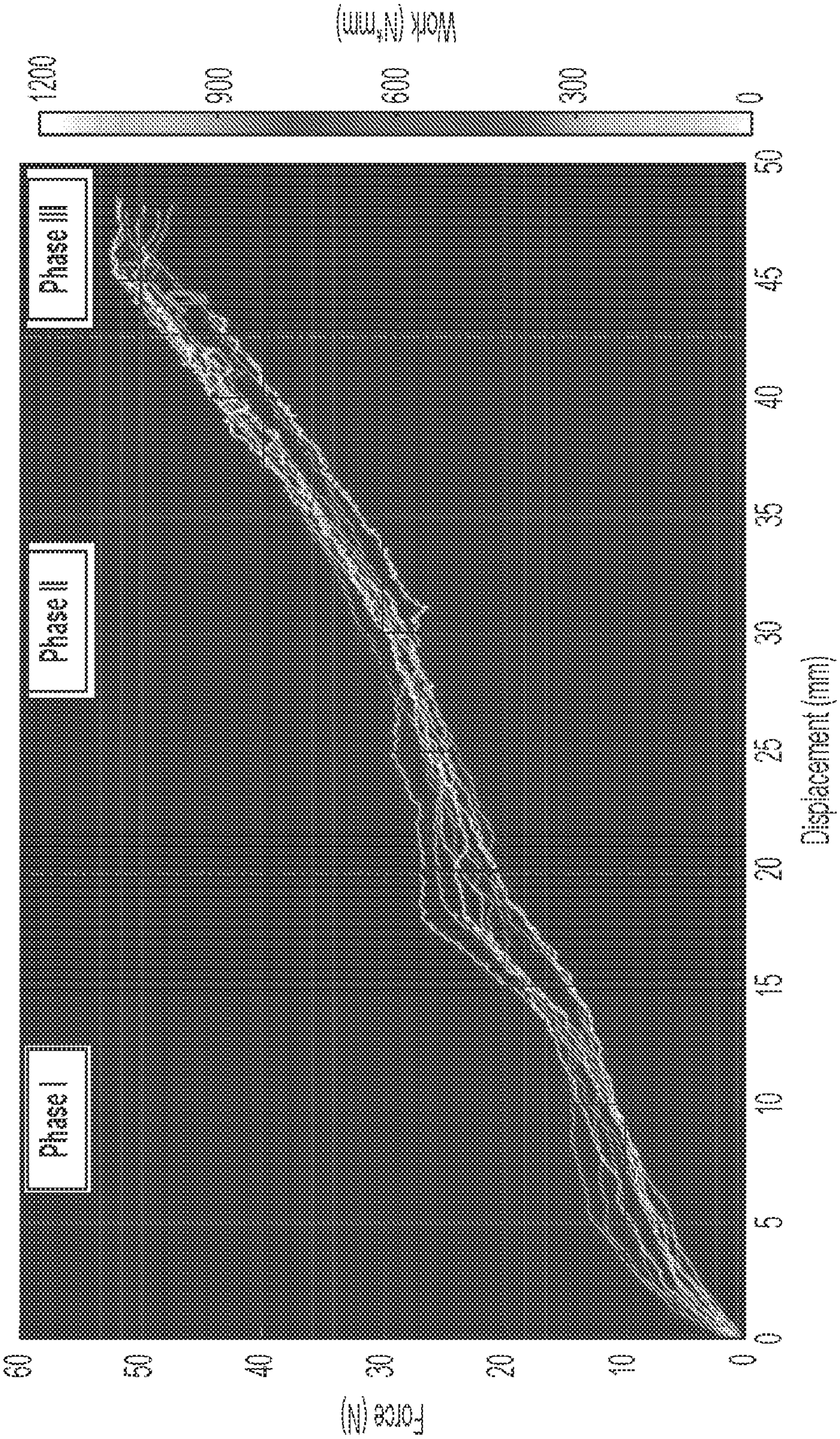
FIG. 8 illustrates a graph of a simulation force-displacement distributions of the embodiment of FIG. 1.

The haptic device is shown to be able to render stable masses of range 0.1 kg-5 kg. FIGS. 5-7 show stable oscillation for high and low damping and stiffness values. The limits of the parameters show the device has the necessary Z-Width to render the trocar insertion model. The experimental position of the platform also closely matches the Matlab numerical solution for all rendered Spring-Mass-Damper systems demonstrating mechanical and virtual accuracy. The distribution of the ideal force profile was shown in FIG. 4. The Force-Displacement profile shown in FIG. 8 does not match the prominent shape due to the inherent variable input applied by a human user. Instead, the mostly monotonic increase typical of measured in vivo insertions are seen.

Figure 9:
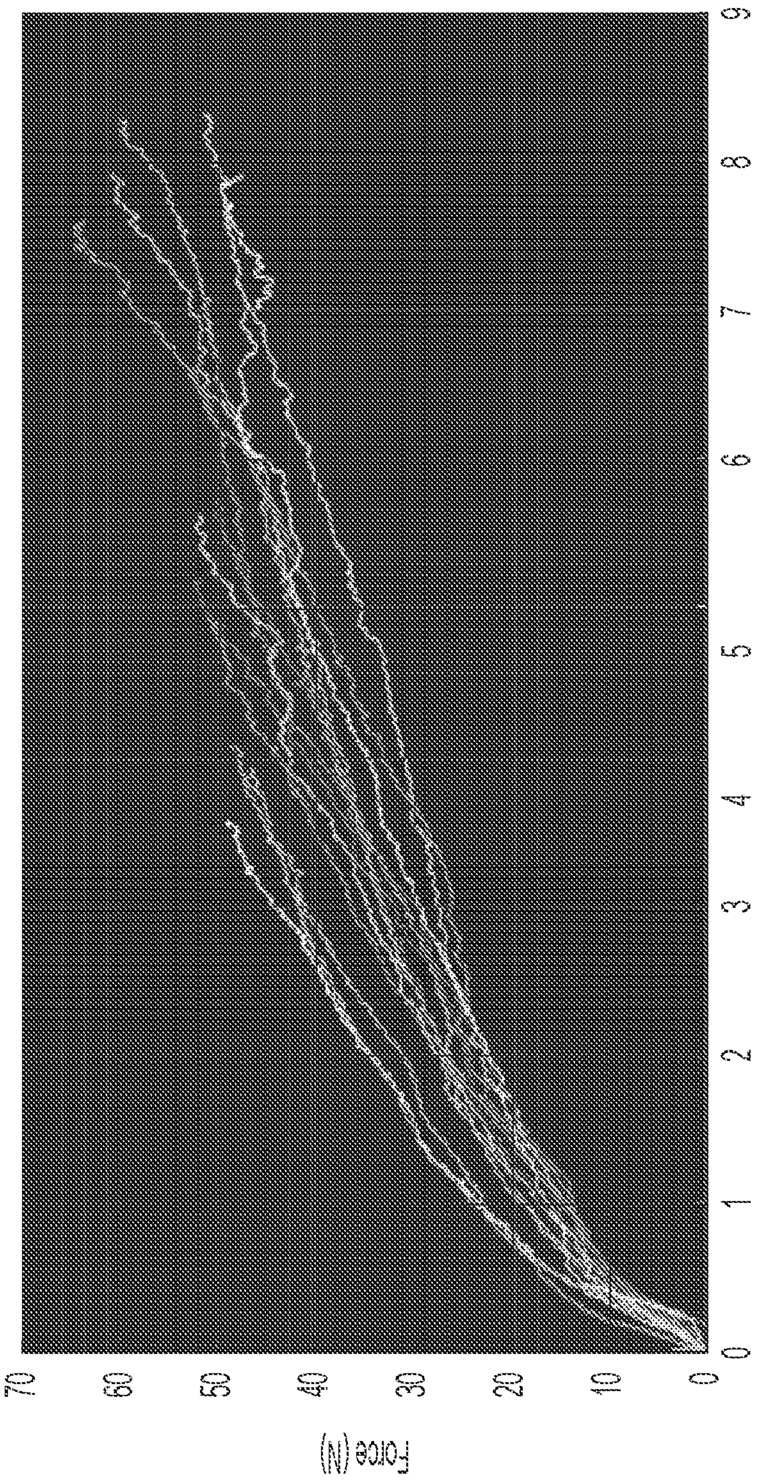
FIG. 9 illustrates a graph of a simulation force-time distributions of the embodiment of FIG. 1.

Regardless, the changes of slope in the plot where the tissue layer fails and the user experiences a sudden change in stiffness are seen. This is also seen the final puncture out of the peritoneum at the end of Phase 3 where stiffness disappears and the curve sees a final dip. The gradient bar is also shown to denote the amount of work applied to the abdomen resulting in the failure criterion used for the tissue layers. Although, the Force-Displacement curve sees a high convergence in paths, the Force-Time curve seen in FIG. 9 shows the drastically different ways the user can approach the simulation while still utilizing the same simplistic model.

Figure 10:
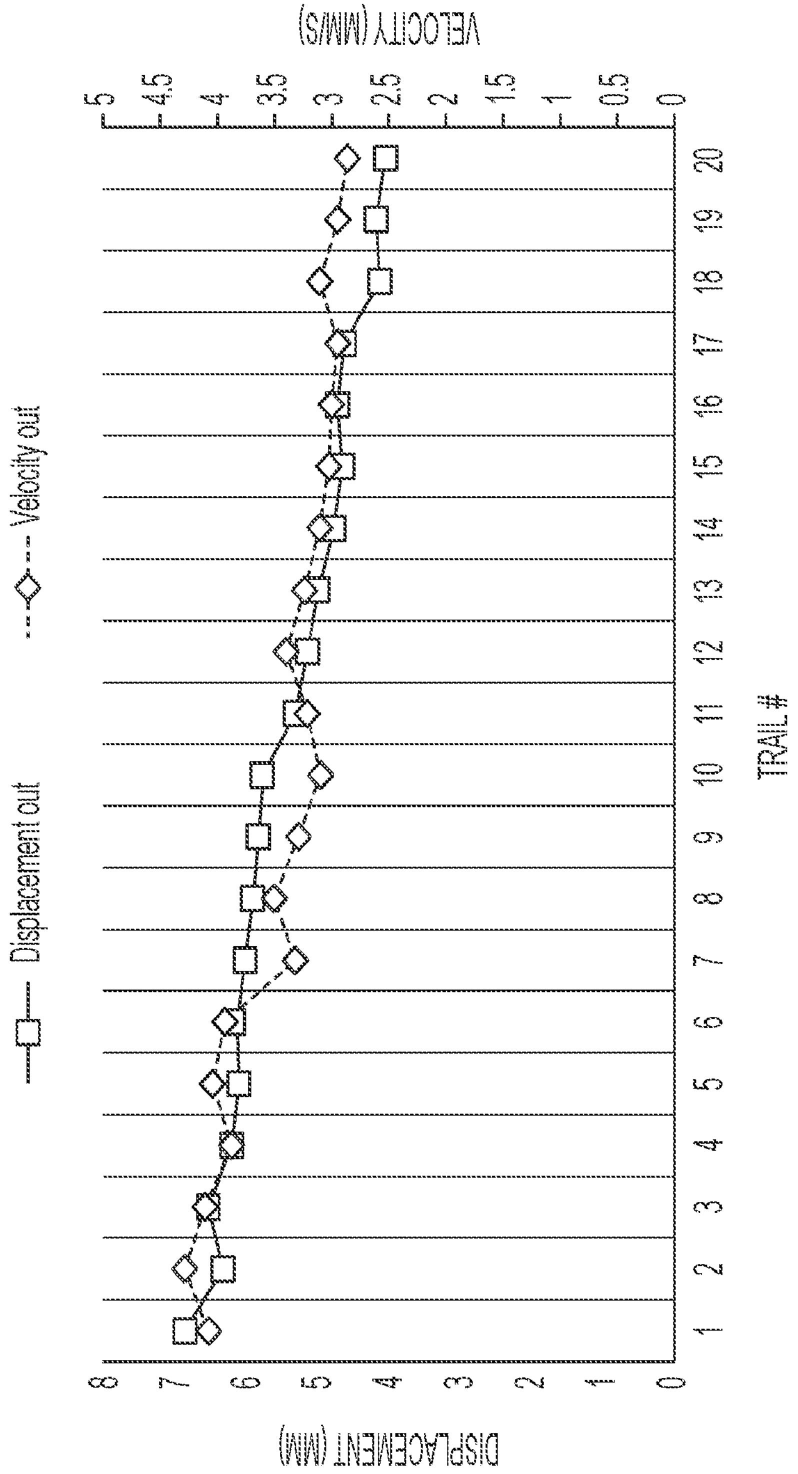
FIG. 10 illustrates a graph of puncture out displacement and velocity values for twenty trials of the embodiment of FIG. 1.

The results for a sequence of twenty trials are shown in FIG. 10 where the values of the two measured values, $\dot{x}_p$, and $\Delta x_p$, are plotted against trial iteration. A downwards trend is noticed of the puncture out velocity and the net displacement after puncture out as the user becomes familiarized with the device and the change in force resistance as the platform displacement increases. The decrease in velocity indicates an progressive deceleration of the tool as the user begin to expect the puncture out and lower insertion force accordingly. This lower velocity then leads to a smaller displacement after the final breaking point.

CONCLUSION

Exemplary embodiments of the present disclosure demonstrate the use of a Stewart platform-based system as a haptic training system for trocar insertion. Exemplary embodiments are presented in a portable platform which places it within the realm of practicality for most teaching and training purposes.

It is demonstrated that the mechanical device is able to render a deformable environment with changing stiffness and damping using admittance haptic rendering methods. Additionally, a simplified numerical model is developed for the insertion of a needle into the abdomen which is then used to create an effective simulation of the medical procedure.

The result is a simulated force profile which exhibits similar characteristics to those found from experimental curves found in the literature. This system has shown potential as a capable haptic training system for trocar insertion.

REFERENCES

The contents of the following references are incorporated by reference herein:

[1] Alkatout, I., Mettler, L., Maass, N., No'e, G. K., and Elessawy, M. Abdominal anatomy in the context of port placement and trocars. Journal of the Turkish German Gynecological Association 16(4), 241-251, 2015.

[2] Krishnakumar S, Tambe P. Entry complications in laparoscopic surgery. J Gynecol Endosc Surg. 2009; 1(1):4-11. doi:10.4103/0974-1216.51902

[3] Fuller, J., Ashar, B. S., and Carey-Corrado, J. Trocar-associated injuries and fatalities: An analysis of 1399 reports to the FDA. Journal of Minimally Invasive Gynecology 12(4), 302. 2005.

[4] H. T. Sharp, et al. Complications associated with optical-access laparoscopic trocar. Obstet. Gynecol. vol. 99, no. 4, pp: 553-555, 2002.

[5] Vilos G A, Ternamian A, Dempster J, Laberge P Y, Laparoscopic entry: a review of techniques, technologies, and complications. J Obstet Gynaecol Can. 2007; 29(5): 433-447.

[6] Burke, C., Nathan, E., Karthigasu, K. et al. Laparoscopic entry—the experience of a range of gynaecological surgeons. Gynecol Surg, 6, 125-133 (2009).

[7] Agha, Riaz A, and Alexander J Fowler. The role and validity of surgical simulation. International surgery vol. 100, 2 (2015): 350-7.

[8] Lin Y, Wang X, Wu F, Chen X, Wang C, Shen G. Development and validation of a surgical training simulator with haptic feedback for learning bone-sawing skill. J Biomed Inform. 2014; 48:122-129.

[9] Seo, Y. W., Chowriappa, A., Guru, K., and Kesavadas, T. TroSim: New Haptic Simulator for Trocar Insertion Procedure. SAGES 2013 (2013).

[10] Seo, Y. W., Chowriappa, A., Abraham, A., Guru, K., and Kesavadas, T. Methodology for haptic modeling of trocar insertion procedure. ASME International Mechanical Engineering Congress and Exposition vol. 56215, p. V03AT03A071. (2013)

[11] Dasgupta, B. and Mruthyunjaya, T. S., The Stewart platform manipulator: a review. Mechanism and Machine Theory 35.1 (2000): 15-40.

[12] Faulring E L, Colgate J E, Peshkin M A. The Cobotic Hand Controller: Design, Control and Performance of a Novel Haptic Display. The International Journal of Robotics Research. 2006; 25(11): 1099-1119.

[13] Lin, M. (Ed.), Otaduy, M. (Ed.). (2008). Haptic Rendering. New York: A K Peters/CRC Press.

[14] Reich, H., Ribeiro, S. C., Rasmussen, C., Rosenberg, J., Vidali, A. High-pressure trocar insertion technique. JSLS: Journal of the Society of Laparoendoscopic Surgeons 1999. 3(1), 45-48.

[15] Arulesan, V., Srimathveeravalli, G., Kesavadas, T., Nagathan, P., and Baier, R. Data acquisition and development of a trocar insertion simulator using synthetic tissue models. Studies in Health Technology and Informatics 125, 25-27, 2007.

[16] Moreno D G, Pereira C A M, Sant Anna R K, et al. Laparoscopic Insertion of Various Shaped Trocars in a Porcine Model. JSLS. 2019.

[17] Ng, P. S., Sahota, D. S., and Yuen, P. Measurement of Trocar Insertion Force Using a Piezoelectric Transducer. Journal of the American Association of Gynecologic Laparoscopists 10(4), 534-538, 2003.

[18] Son, J. and Tadano, K. Force characteristics and effective stopping upon the wall is penetrated out by trocar during laparascopic surgery. Journal of Mechanics in Medicine and Biology 18.03, 2018.

[19] Carlo C. Passerotti, Nikolai Begg, Frank J. Penna, Ana Maria A. M. S. Passerotti, Katia R. M. Leite, Alberto Azoubel Antunes, Miguel Srougi, Alan B. Retik, Hiep T. Nguyen, Safety Profile of Trocar and Insufflation Needle Access Systems in Laparoscopic Surgery, Journal of the American College of Surgeons Volume 209, Issue 2, 2009.

[20] Okamura, A. M., C. Simone, and M. D. O'Leary. Force modeling for needle insertion into soft tissue. IEEE Trans. Biomed. Eng. 51(10):1707-1716, 2004.

[21] Constantinescu D, Salcudean S E, Croft E A (2005) Haptic rendering of rigid contacts using impulsive and penalty forces. IEEE Transactions on Robotics 21(3): 309-323.

[22] Balaniuk, Remis. (2006). A differential method for the haptic rendering of deformable objects. 297-304.

[23] Keemink, A. Q., van der Kooij, H., Stienen, A. H. (2018). Admittance control for physical human-robot interaction. The International Journal of Robotics Research, 37(11), 1421-1444.

[24] Y. Kobayashi, A. Onishi, T. Hoshi, K. Kawamura and M. G. Fujie, "Modeling of conditions where a puncture occurs during needle insertion considering probability distribution," 2008 IEEE/RSJ International Conference on Intelligent Robots and Systems Nice, 2008, pp. 1433-1440.

[25] R. J. Adams and B. Hannaford. Stable haptic interaction with virtual environments. IEEE Transactions on Robotics and Automation, vol. 15, no. 3, pp. 465-474, June 1999, doi: 10.1109/70.768179.

[26] Mahvash M, Dupont P E. Mechanics of dynamic needle insertion into a biological material. IEEE Trans Biomed Eng. 57(4):934-43, 2010.

The invention claimed is:

1. A system for simulating insertion of a trocar, the system comprising:

a planar member;

an elongated member coupled to the planar member;

a force transducer coupled to the elongated member and the planar member;

a plurality of support members coupled to the planar member; and a plurality of actuators, wherein each actuator is coupled to a support member;

a computer processor, wherein:

the force transducer is configured to provide an admittance haptic feedback in response to an external force input applied to the elongated member; and the admittance haptic feedback is configured to simulate penetration of and advancement through a plurality of tissue layers, the plurality of tissue layers comprising: a skin layer, a muscle and fat layer, and a peritoneum layer.

2. The system of claim 1 further comprising a visual display of the elongated member and the plurality of tissue layers.

3. The system of claim 1 wherein the admittance haptic feedback provides:

a force feedback when the elongated member is moved with respect to the planar member;

a first decrease in force feedback to simulate penetration of the skin layer;

a second decrease in force feedback to simulate penetration of the muscle and fat layer; and a third decrease in force feedback to simulate penetration of the peritoneum layer.

4. The system of claim 2 wherein the visual display communicates with the computer processor such that a simulated movement of the elongated member in the visual display is synchronized with a movement of the elongated member.

5. The system of claim 3 wherein the simulated movement of the elongated member in the visual display is synchronized with the force feedback when the elongated member is moved with respect to the planar member.

6. The system of claim 5 wherein the simulated movement of the elongated member in the visual display simulates a visual display of penetration of the skin layer by the elongated member when the admittance haptic feedback provides the first decrease in force feedback to simulate penetration of the skin layer.

7. The system of claim 5 wherein the simulated movement of the elongated member in the visual display simulates a visual display of penetration of the muscle and fat layer by the elongated member when the admittance haptic feedback provides the second decrease in force feedback to simulate penetration of the muscle and fat layer.

8. The system of claim 5 wherein the simulated movement of the elongated member in the visual display simulates a visual display of penetration of the peritoneum layer by the elongated member when the admittance haptic feedback provides the third decrease in force feedback to simulate penetration of the peritoneum layer.

9. The system of claim 1 wherein the system provides the admittance haptic feedback by sensing the external force input and outputting a corresponding displacement of the elongated member.

10. The system of claim 1 wherein the wherein the plurality of actuators are configured as servomotors.

11. The system of claim 1 wherein:

the system further comprises a second planar member comprising an aperture; and the elongated member extends through the aperture.

12. The system of claim 1 further comprising a third planar member, wherein the plurality of actuators are coupled to the third planar member.

13. A method of simulating insertion of a trocar, the method comprising:

providing a system comprising:

a planar member;

an elongated member coupled to the planar member;

a force transducer coupled to the elongated member and the planar member;

a computer processor, and;

providing the admittance haptic feedback in response to an external force input applied to the elongated member, wherein the admittance haptic feedback is configured to simulate penetration of and advancement through a plurality of layers of tissue of a patient, the plurality of layers of tissue comprising skin layer, a muscle and fat layer, and a peritoneum layer.

14. The method of claim 13 wherein providing the admittance haptic feedback comprises sensing the external force input and outputting a corresponding displacement of the elongated member.

15. The method of claim 14 wherein the corresponding displacement of the elongated member is generated by a plurality of actuators.

16. The method of claim 13 wherein the admittance haptic feedback provides:

a force feedback when the elongated member is moved;

a first decrease in force feedback to simulate penetration of the skin layer;

a second decrease in force feedback to simulate penetration of the muscle and fat layer; and a third decrease in force feedback to simulate penetration of the peritoneum layer.

17. The method of claim 13 further comprising:

displaying a simulated movement of the elongated member that is synchronized with a movement of the elongated member.

18. The method of claim 16 wherein:

the simulated movement of the elongated member is synchronized with the force feedback when the elongated member is moved.

* * * * *